US007298315B2

(12) United States Patent
Gerlach et al.

(10) Patent No.: US 7,298,315 B2
(45) Date of Patent: Nov. 20, 2007

(54) RADAR PULSE COMPRESSION REPAIR

(75) Inventors: Karl R Gerlach, Chesapeake Beach, MD (US); Shannon D Blunt, Shawnee, KS (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 120 days.

(21) Appl. No.: 11/268,410

(22) Filed: Nov. 7, 2005

(65) Prior Publication Data
US 2006/0097908 A1 May 11, 2006

Related U.S. Application Data

(60) Provisional application No. 60/626,502, filed on Nov. 8, 2004.

(51) Int. Cl.
*G01S 13/52* (2006.01)
(52) U.S. Cl. ........................ 342/159; 342/195; 342/162; 342/194; 342/89
(58) Field of Classification Search ........ 342/159–162, 342/194, 195, 103
See application file for complete search history.

(56) References Cited

U.S. PATENT DOCUMENTS

| | | | |
|---|---|---|---|
| 4,626,853 A | | 12/1986 | Lee et al. |
| H0767 H | * | 4/1990 | Kretschmer et al. ........ 342/145 |
| 5,047,784 A | * | 9/1991 | Gerlach et al. ............. 342/201 |
| 5,805,107 A | | 9/1998 | Schroth et al. |
| 6,940,450 B2 | | 9/2005 | Blunt et al. |
| 7,167,884 B2 | * | 1/2007 | Picciolo et al. ............. 708/322 |
| 7,193,558 B1 | * | 3/2007 | Gerlach et al. ............. 342/195 |
| 7,212,150 B2 | * | 5/2007 | Blunt et al. .................. 342/91 |
| 2005/0179585 A1 | * | 8/2005 | Walker et al. .............. 342/134 |
| 2005/0195103 A1 | * | 9/2005 | Davis et al. ................. 342/99 |
| 2006/0097908 A1 | * | 5/2006 | Gerlach et al. ............. 342/159 |
| 2006/0238412 A1 | * | 10/2006 | Blunt et al. ................. 342/160 |

OTHER PUBLICATIONS

"Doppler optimised mismatched filters", Zejak, A.J.; Zentner, E.; Rapajic, P.B.Electronics Letters vol. 27, Issue 7, Mar. 28, 1991 pp. 558-560.*
"A digital-analog hybrid technique for low range sidelobe pulse compression", Sato, K.; Horie, H.; Hanado, H.; Kumagai, H. Geoscience and Remote Sensing, IEEE Transactions on vol. 39, Issue 7, Jul. 2001 Ps:1612-1615.*

(Continued)

*Primary Examiner*—John B Sotomayor
(74) *Attorney, Agent, or Firm*—John J. Karasek; L. George Legg

(57) ABSTRACT

A radar pulse compression repair (RPCR) system includes a receiver for receiving a radar return signal, a matched filter for applying matched filtering to the radar return signal to generate a matched filter output, a processor programmed for applying Radar Pulse Compression Repair (RPCR) to the matched filter output to suppress a plurality of range sidelobes from the matched filter output, and a detector for receiving the RPCR-processed output. The RPCR invention in operating upon the output of the matched filter enables RPCR to be employed as a post-processing stage in systems where it is not feasible to replace the existing pulse compression apparatus. RCPR can also be selectively employed when it is possible that large targets are present that may be masking smaller targets, thereby keeping computational complexity to a minimum.

23 Claims, 4 Drawing Sheets

OTHER PUBLICATIONS

"Adaptive pulse compression repair processing", Blunt, S.D.; Gerlach, K. Radar Conference, 2005 IEEE International May 9-12, 2005 pp. 519-523.*

"Development of modified polyphase P codes with optimum sidelobe characteristics", Lee, W.-K.; Griffiths, H.D. Radar, Sonar and Navigation, IEE Proceedings—vol. 151, Issue 4, Aug. 2004 Ps: 210-220.*

T. Felhauer, "Digital Signal Processing for Optimum Wideband Channel Estimation in the Presence of Noise." *IEE Proceedings-P*, vol. 140, No. 3, pp. 179-186, Jun. 1993.

S. M. Song. et al, "Estimation Theoretic Approach for Radar Pulse Compression Processing and its Optimal Codes." *Electronic Letters*, vol. 35, No. 3, pp. 250-252, Feb. 2000.

* cited by examiner

RADAR PULSE COMPRESSION REPAIR

CROSS-REFERENCE TO RELATED APPLICATIONS

The present application claims the benefit of the priority filing date of provisional patent application No. 60/626,502, filed Nov. 8, 2004, incorporated herein by reference.

BACKGROUND OF THE INVENTION

The present invention relates to radar signal processing. More particularly, the present invention relates to the post-matched filter processing repair of radar return signals.

Range sidelobe suppression in radar pulse compression has been a topic of intense scrutiny for several years. The goal is to minimize the effects caused by the correlation of a transmitted waveform with delayed versions of itself while maintaining close to the optimal signal-to-noise ratio (SNR). One approach has sought to achieve this by employing some form of least squares (LS) estimation; see, for example, U.S. Pat. No. 5,805,107. LS has been shown to provide the most efficient estimator when the additive noise is white. However, LS is not robust in that it does not account for scatterers closer than some nominal range $R_0$, which can have a deleterious effect on the estimation of the channel at the ranges of interest.

Another approach termed Reiterative Minimum Mean-Square Error (RMMSE) estimation and described in U.S. Pat. No. 6,940,450, issued Sep. 6, 2005 and incorporated herein by reference, provides a robust estimate of the radar channel impulse response that is almost completely devoid of range sidelobes. This approach, however, as with LS estimation, involves replacing the standard matched filter within legacy radar systems, which is not always a feasible solution.

It would therefore be desirable to provide an approach for decreasing the radar sidelobes after a standard matched filter radar signal processing operation.

BRIEF SUMMARY OF THE INVENTION

According to the invention, a radar pulse compression repair (RPCR) system includes a receiver for receiving a radar return signal, a matched filter for applying matched filtering to the radar return signal to generate a matched filter output, a processor programmed for applying Radar Pulse Compression Repair (RPCR) to the matched filter output to suppress a plurality of range sidelobes from the matched filter output, and a detector for receiving the RPCR-processed output. RPCR is preferably repeated until the range sidelobes are suppressed to the level of a noise floor. In a preferred embodiment, the received radar return signal at the $l^{th}$ range gate is defined as $$y(l)=x^T(l)s+v(l) \quad (1)$$

for $l=0, \ldots, L+N-2$, where $x(l)=[x(l) \; x(l-1) \ldots x(l-N+1)]^T$ is a set of impulse response coefficients that a transmitted waveform s is convolved with at delay $l$, $v(l)$ is additive noise, $(\cdot)^T$ is a transpose operation, and L is a number of range gates in a processing window, a system response model based on collecting N samples of the received radar return signal is expressed as $$y(l)=[x(l)x(l+1) \ldots x(l+N-1)]^T s+v(l)=X^T(l)s+v(l) \quad (2)$$

where $y(l)=[y(l) \; y(l+1) \ldots y(l+N-1)]^T$ and $v(l)=[v(l) \; v(l+1) \ldots v(l+N-1)]^T$, the matched filtering operation comprises convolving the received radar return signal with a time-reversed complex conjugate of the transmitted waveform as expressed in the digital domain as $$\hat{x}_{MF}(l)=s^H y(l) \quad (3),$$

the convolution of the transmitted waveform with the radar impulse response (1) and the convolution of the received radar return signal with the time-reversed, complex conjugated waveform (3) are combined and represented as $$\hat{x}_{MF}(l)=r^T \tilde{x}(l)+u(l) \quad (4),$$

where $\tilde{x}(l)=[x(l+N-1) \ldots x(l+1) \; x(l) \; x(l-1) \ldots x(l-N+1)]^T$, $u(l)$ is an additive noise correlated by the matched filtering, and r is a length 2N-1 result of the convolution of the transmitted waveform s and a receive filter $\bar{s}^*=\lfloor s^*(N-1) \; s^*(N-2) \ldots s^*(0) \rfloor$, collecting 2N-1 samples of the matched filter output (4) and representing is as the received radar return signal as in equation (1) to which the filtering operation $$\hat{x}_{RPCR}(l)=w^H(l)\hat{x}_{MF}(l) \quad (5)$$

is performed in which an assumed transmitted waveform is r, estimating an optimal receive filter for each individual range gate as $$w(l)=\rho(l) \; (C(l)+R)^{-1} r \quad (6)$$

where $\rho(l)=E[|x(l)|^2]$ is an expected power of $x(l)$, or alternatively $\rho(l)=E[|x(l)|^\alpha]$, where values for $\alpha$ preferably fall within $1 \leq \alpha \leq 1.7$, $R=E[u(l) \; u^H(l)]$ is a noise covariance matrix, and the matrix $C(l)$ is defined as $$C(l) = \sum_{n=-2N+2}^{2N-2} \rho(l-n)r_n r_n^H \quad (7)$$

in which $r_n$ contains the elements of the length 2N-1 waveform autocorrelation r right-shifted by n samples and the remainder zero filled; (6) may be applied reiteratively to improve the accuracy of the estimate. In the embodiment in which the invention employs a stability factor, $\alpha$ replaces the exponent in $\rho(l)=E[|x(l)|^2]$ resulting in $\rho(l)=E[|x(l)|^\alpha]$, where values for $\alpha$ preferably fall within $1 \leq \alpha \leq 1.7$, in the processing algorithm to keep the matrix $C(l)$ from becoming ill-conditioned when the received radar return signal has a large dynamic range.

The RPCR invention advantageously operates upon the output of the matched filter. This therefore enables RPCR to be employed as a post-processing stage in systems where it is not feasible to replace the existing pulse compression apparatus. RCPR can also be selectively employed when it is possible that large targets are present that may be masking smaller targets, thereby keeping computational complexity to a minimum.

DETAILED DESCRIPTION OF THE INVENTION

Definitions: The term "convolution" means the process that yields the output response of an input to a linear time-invariant system, such as is described and defined in J. G. Proakis and D. G. Manolakis, *Digital Signal Processing: Principles, Algorithms, and Applications*, 3rd Ed., pp. 75-82, Prentice Hall: Upper Saddle River, N.J. (1996), incorporated herein by reference. The term "deconvolution" as used herein means the process that given the output of a system determines an unknown input signal to the system. See Id. at p. 355, incorporated herein by reference. The term "scatterer" means something in the path of a transmitted waveform that causes a significant reflection (relative to the noise) back to the receiver of the sensor.

The new radar pulse compression repair (RPCR) method and system is based on applying Reiterative Minimum Mean-Square Error (MMSE) estimation (described further below) after standard pulse compression via matched filtering.

Figure 1:
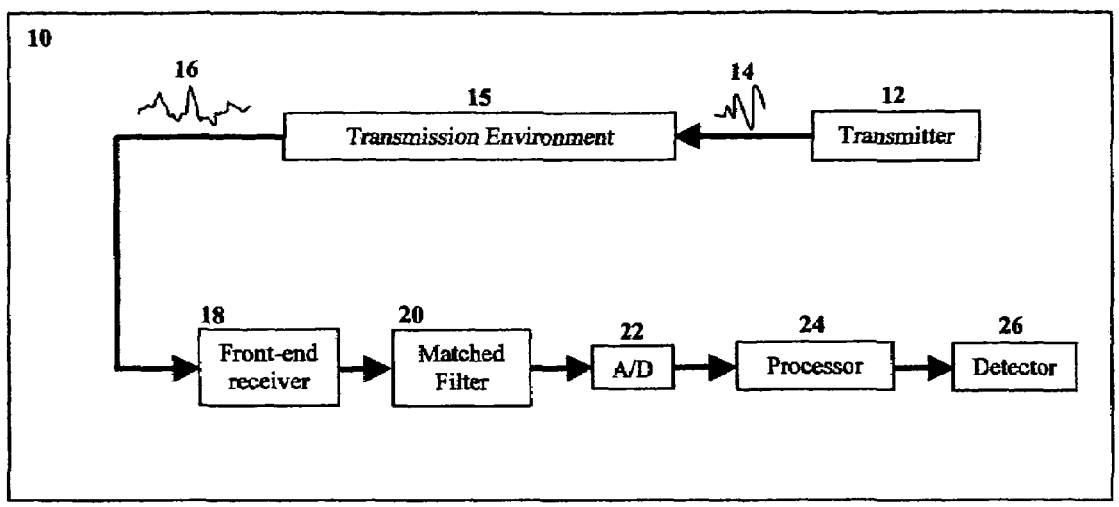
FIG. 1 is an RCPR system according to the invention.
Figure 2:
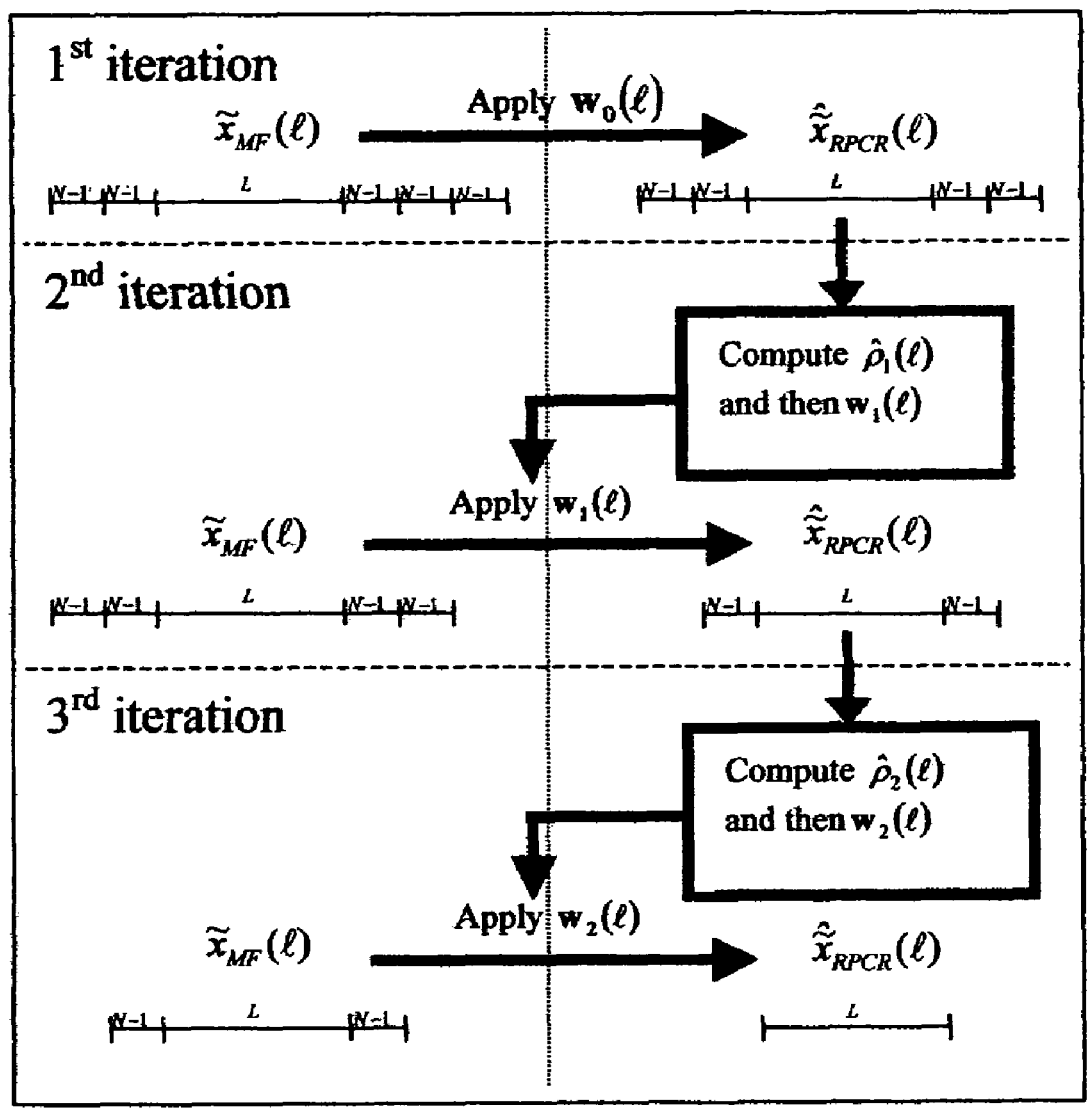
FIG. 2 is a schematic diagram of the RCPR processing methodology according to the invention.

Referring now to FIG. 1, an RPCR system 10 includes a radar transmitter 12 for transmitting a radar pulse waveform 14 through a transmission environment 15 toward a target (not illustrated) resulting in a radar return signal 16.

We denote the discrete-time version of the transmitted waveform 14 as the column vector s having length N. A receiver 18 receives a radar return signal 16. According to the range resolution of the transmitted waveform, the received signal 16 at the $l^{th}$ range gate is defined as $$y(l) = x^T(l)s + v(l) \quad (1)$$

for $l = 0, \ldots, L+N-2$, where $x(l) = [x(l) \ x(l-1) \ \ldots \ x(l-N+1)]^T$ is the set of impulse response coefficients representing the radar scattering objects in the environment which reflected the transmitted waveform 14 $s$ at delay $l$, $v(l)$ is additive noise, $(\bullet)^T$ is the transpose operation, and L is the number of range gates in the processing window. Collecting N samples of the received radar return signal 16, the system response model is expressed as $$y(l) = [x(l) \ x(l+1) \ \ldots \ x(l+N-1)]^T s + v(l) = X^T(l)s + v(l) \quad (2)$$

where $y(l) = [y(l) \ y(l+1) \ \ldots \ y(l+N-1)]^T$ and $v(l) = [v(l) \ v(l+1) \ \ldots \ v(l+N-1)]^T$. A matched filter 20 convolves the received radar return signal 16 with the time-reversed complex conjugate of the transmitted waveform 14 which can be expressed in the digital domain as $$\hat{x}_{MF}(l) = s^H y(l). \quad (3)$$

Figure 3:
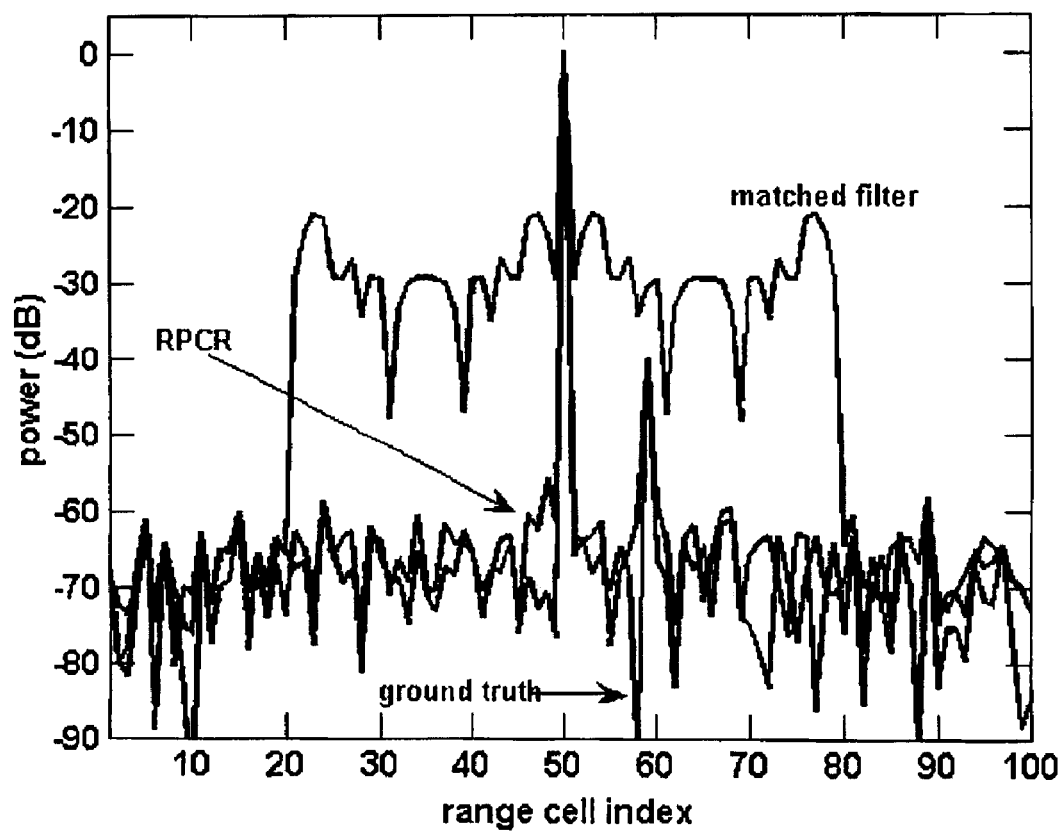
FIG. 3 is a graph showing range sidelobes resulting from matched filtering and the repair of the matched filter output using RPCR for one large target and one small target in noise according to the invention.

Following matched filtering, a legacy radar system may employ an A/D converter 22 as well as some additional processing 24 prior to applying a detector 26 to the matched filter output. However, it is well-known that the matched filter 20 generates range sidelobes in range cells near to large target returns. An example of this is depicted in FIG. 3 for the matched filter output using a length N=30 Frank-Kretschmer P3 code (waveform) whereby the range sidelobes from the large target mask the small nearby target. For targets that greatly exceed the level of the noise (by 60 dB in the example but typically by 30+ dB depending on the particular waveform), smaller targets can be masked by the residual range sidelobes in the range cells surrounding large targets.

In some legacy radar systems it is not feasible to replace the existing pulse compression apparatus to enable robust range sidelobe suppression. However, range sidelobe suppression can still be achieved by post-processing the output of matched filter 20 via an analog-to-digital (AD) convertor 22 and a processor 24 for applying RPCR to the digitized matched filter output prior to the detector 24. The received signal model for RPCR involves the combination of the operations of convolution of the transmitted waveform 14 with the radar impulse response (i.e. equation (1)) and the convolution of the received return signal 16 with the time-reversed, complex conjugated waveform via the matched filter 20 (i.e. equation (3) which is represented as $$\hat{x}_{MF}(l) = r^T \tilde{x}(l) + u(l) \quad (4)$$

where $\tilde{x}(l) = [x(l+N-1) \ \ldots \ x(l+1) \ x(l) \ x(l-1) \ \ldots \ x(l-N+1)]^T$, $u(l)$ is additive noise correlated by the matched filter, and r is the length $2N-1$ convolution of the transmitted waveform s and the receive filter $\bar{s}^* = \lfloor s^*(N-1) \ s^*(N-2) \ \ldots \ s^*(0) \rfloor$ (in other words r is the autocorrelation of s) Treating the matched filter output in (4) as the received return signal (i.e. as in equation (1)), a variant of the RMMSE adaptive pulse compression algorithm described in U.S. Pat. No. 6,940,450, issued Sep. 6, 2005 and incorporated herein by reference, termed Radar Pulse Compression Repair (RPCR), is applied to the matched filter output as $$\hat{x}_{RPCR}(l) = w^H(l)\hat{x}_{MF}(l) \quad (5)$$

in which the assumed transmitted waveform for the RPCR received signal model is r.

The RPCR algorithm estimates the optimal receive filter for each individual range gate as $$w(l) = \rho(l) \ (C(l)+R)^{-1} r \quad (6)$$

where $\rho(l) = E[|x(l)|^2]$ is the expected power of $x(l)$, $R = E[u(l) u^H(l)]$ is the noise covariance matrix, and the matrix C(l) is defined as $$C(l) = \sum_{n=-2N+2}^{2N-2} \rho(l-n) r_n r_n^H \quad (7)$$

in which $r_n$ contains the elements of the length $2N-1$ waveform autocorrelation r right-shifted by n samples and the remainder zero filled.

Given the range cell estimates from the output of the matched filter, one can then reiteratively apply (6) in order to further improve the accuracy of the estimate. It has been found that one to three stages allows RPCR to robustly suppress the range sidelobes to the level of the noise floor when the radar return channel is somewhat sparsely parameterized (as is the case with high range resolution radar).

Note that each reiteration stage will reduce the number of range gate estimates by $2(2N-2)$. To counteract this, it is preferred to increase the window of range gates by $2M(2N-2)$, where M is the number of stages.

Finally, to maximize numerical efficiency, RPCR may be implemented using a variation of the matrix inversion lemma.

In a preferred embodiment, a stability factor $\alpha$ replaces the exponent in $\rho(l) = E[|x(l)|^2]$ in (6) resulting in $$\rho(l) = E[|x(l)|^\alpha]. \quad (8)$$

The stability factor is used to keep the matrix C(l) from becoming ill-conditioned when the received radar return signal has a large dynamic range. Preferred values for α fall within $1 \leq \alpha \leq 1.7$. Furthermore, similar to the adaptation step-size in closed-loop algorithms, it is preferable to set α at the high end initially and allow it to decrease to the low end by the final stage.

EXAMPLES

As an example, we use an N=30 Lewis-Kretschmer P3 code (waveform) for a radar impulse response containing one large target (with 60 dB SNR) and a smaller target (with 20 dB SNR). The RPCR algorithm is applied to the matched filter output using 1 stage with the stability parameter set as α=1.6. FIG. 3 presents the ground truth and matched filter output as well as the results of the RPCR algorithm.

The single stage of the RPCR algorithm results in a reduction of the Mean-Square Error (MSE) between the estimate and ground truth of 34 dB over the MSE of the matched filter. Also, the mismatch filter response (the matched filter response divided by the RPCR response) for the range cell containing the large target is only 0.05 dB.

Figure 4:
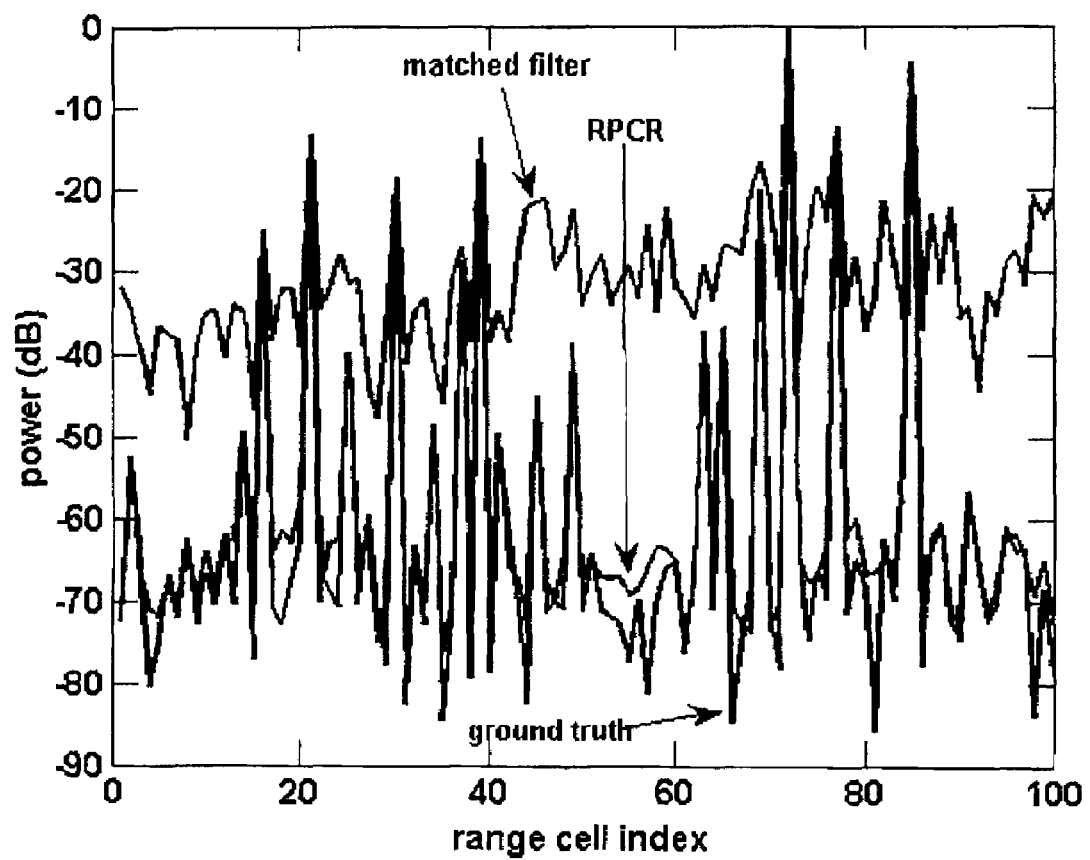
FIG. 4 is a graph showing a matched filter output and the repair of the matched filter output using RPCR for dense target scenario.

For a more stressing example, we examine the performance when there are numerous targets: both large and small. We employ 2 stages of the RPCR algorithm with $\alpha_1=1.6$ and $\alpha_2=1.4$. In FIG. 4 we see that many small targets are masked by the larger targets in the matched filter output. By comparison, RPCR is able to suppress the range sidelobes that result from the matched filter down to the level of the noise. In so doing, it also reveals many smaller targets that were masked by larger neighboring targets and almost exactly coincides with the ground truth. In terms of the MSE, the RPCR reduces the MSE exhibited by the matched filter by 41 dB.

Obviously many modifications and variations of the present invention are possible in light of the above teachings. It is therefore to be understood that the scope of the invention should be determined by referring to the following appended claims.

What is claimed as new and desired to be protected by Letters Patent of the United States is:

1. A method for post-processing repair of a radar return signal, comprising:
   a) receiving a radar return signal;
   b) applying matched filtering to said radar return signal to generate a matched filter output; and
   c) applying Radar Pulse Compression Repair (RPCR) to said matched filter output to thereby suppress a plurality of range sidelobes from said matched filter output.

2. A method as in claim 1, wherein RPCR is repeated until the range sidelobes are suppressed to the level of a noise floor.

3. A method as in claim 1, wherein the received radar return signal at the $l^{th}$ range gate is defined as $$y(l)=x^T(l)s+v(l) \quad (1)$$

for $l=0, \ldots, L+N-2$, where $x(l)=[x(l)\ x(l-1) \ldots x(l-N+1)]^T$ is a set of impulse response coefficients that a transmitted waveform s is convolved with at delay l, v(l) is additive noise, $(\bullet)^T$ is a transpose operation, and L is a number of range gates in a processing window, a system response model based on collecting N samples of the received radar return signal is expressed as $$y(l)=[x(l)\ x(l+1) \ldots x(l+N-1)]^T s+v(l)=X^T(l)s+v(l) \quad (2)$$

where $y(l)=[y(l)\ y(l+1) \ldots y(l+N-1)]^T$ and $v(l)=[v(l)\ v(l+1) \ldots v(l+N-1)]^T$, the matched filtering operation comprises convolving the received radar return signal with a time-reversed complex conjugate of the transmitted waveform as expressed in the digital domain as $$\hat{x}_{MF}(l)=\bar{s}^H y(l) \quad (3),$$

the convolution of the transmitted waveform with the radar impulse response (1) and the convolution of the received radar return signal with the time-reversed, complex conjugated waveform (3) are combined and represented as $$\hat{x}_{MF}(l)=r^T \tilde{x}(l)+u(l) \quad (4),$$

where $\tilde{x}(l)=[x(l+N1) \ldots x(l+1)\ x(l)\ x(l-1) \ldots x(l-N+1)]^T$, u(l) is an additive noise correlated by the matched filtering, and r is a length 2N−1 convolution of the transmitted waveform s and a receive filter $\bar{s}^* = \lfloor s^*(N-1)\ s^*(N-2) \ldots s^*(0) \rfloor$, substituting the matched filter output (4) as the received radar return signal in equation (1) for the operation $$\hat{x}_{RPCR}(l)=w^H(l)\hat{x}_{MF}(l) \quad (5)$$

in which an assumed transmitted waveform is r,
estimating an optimal receive filter for each individual range gate as $$w(l)=\rho(l)(C(l)+R)^{-1}r \quad (6)$$

where $\rho(l)=E[|x(l)|^2]$ is an expected power of x(l), $R=E\lfloor u(l)\ u^H(l) \rfloor$ is a noise covariance matrix, and the matrix C(l) is defined as $$C(l) = \sum_{n=-2N+2}^{2N-2} \rho(l-n) r_n r_n^H \quad (7)$$

in which $r_n$ contains the elements of the length 2N−1 waveform autocorrelation r right-shifted by n samples and the remainder zero filled.

4. A method as in claim 3, wherein (6) is applied reiteratively to improve the accuracy of the estimate.

5. A method as in claim 4, wherein a window of range gates is increased by 2M(2N−2) where M is the number of reiteration stages.

6. A method as in claim 1, wherein the received radar return signal at the $l^{th}$ range gate is defined as $$y(l)=x^T(l)s+v(l) \quad (1)$$

for $l=0, \ldots, L+N-2$, where $x(l)=[x(l)\ x(l-1) \ldots x(l-N+1)]^T$ is a set of impulse response coefficients that a transmitted waveform s is convolved with at delay l, v(l) is additive noise, $(\bullet)^T$ is a transpose operation, and L is a number of range gates in a processing window, a system response model based on collecting N samples of the received radar return signal is expressed as $$y(l)=[x(l)\ x(l+1) \ldots x(l+N-1)]^T s+v(l)=X^T(l)s+v(l) \quad (2)$$

where $y(l)=[y(l)\ y(l+1) \ldots y(l+N-1)]^T$ and $v(l)=[v(l)\ v(l+1) \ldots v(l+N-1)]^T$, the matched filtering operation comprises convolving the received radar return signal with a time-reversed complex conjugate of the transmitted waveform as expressed in the digital domain as $$\hat{x}_{MF}(l)=\bar{s}^H y(l) \quad (3),$$

the convolution of the transmitted waveform with the radar impulse response (1) and the convolution of the received radar return signal with the time-reversed, complex conjugated waveform (3) are combined and represented as $$\hat{x}_{MF}(l) = r^T \tilde{x}(l) + u(l) \qquad (4),$$

where $\tilde{x}(l) = [x(l+N-1) \ldots x(l+1)\ x(l)\ x(l-1) \ldots x(l-N+1)]^T$, $u(l)$ is an additive noise correlated by the matched filtering, and r is a length 2N-1 convolution of the transmitted waveform s and a receive filter $\bar{s}^* = \lfloor s^*(N-1)\ s^*(N-2) \ldots s^*(0) \rfloor$,
substituting the matched filter output (4) as the received radar return signal in equation (1) for the operation $$\hat{x}_{RPCR}(l) = w^H(l) \hat{x}_{MF}(l) \qquad (5)$$

in which an assumed transmitted waveform is r,
estimating an optimal receive filter for each individual range gate as $$w(l) = \rho(l)(C(l)+R)^{-1} r \qquad (6)$$

where $\rho(l) = E[|x(l)|^\alpha]$ is an expected power of $x(l)$, $R = E\lfloor u(l)\ u^H(l) \rfloor$ is a noise covariance matrix, and the matrix $C(l)$ is defined as $$C(l) = \sum_{n=-2N+2}^{2N-2} \rho(l-n) r_n r_n^H \qquad (7)$$

in which $r_n$ contains the elements of the length 2N-1 waveform autocorrelation r right-shifted by n samples and the remainder zero filled.

7. A method as in claim 6, wherein $1 \leq \alpha \leq 1.7$.

8. A method as in claim 6, wherein (6) is applied reiteratively to improve the accuracy of the estimate.

9. A method as in claim 8, wherein a window of range gates is increased by 2M(2N-2) where M is the number of reiteration stages.

10. A method for post-processing repair of a radar return signal, comprising:
receiving a radar return signal, wherein said
received radar return signal at an $l^{th}$ range gate is defined as $$y(l) = x^T(l) s + v(l) \qquad (1)$$

for $l = 0, \ldots, L+N-2$, where $x(l) = [x(l)\ x(l-1) \ldots x(l-N+1)]^T$ is a set of impulse response coefficients that a transmitted waveform s is convolved with at delay l, $v(l)$ is additive noise, $(\bullet)^T$ is a transpose operation, and L is a number of range gates in a processing window;
expressing a system response model based on collecting N samples of the received radar return signal as $$y(l) = [x(l)\ x(l+1) \ldots x(l+N-1)]^T s + v(l) = x^T(l) s + v(l) \qquad (2)$$

where $y(l) = [y(l)\ y(l+1) \ldots y(l+N-1)]^T$ and $v(l) = [v(l)\ v(l+1) \ldots v(l+N-1)]^T$;
applying matched filtering to said received radar return signal to generate a matched filter output, wherein said matched filtering operation comprises convolving the received radar return signal with a time-reversed complex conjugate of the transmitted waveform as expressed in a digital domain as $$\hat{x}_{MF}(l) = s^H y(l) \qquad (3),$$

combining the convolution of the transmitted waveform with the radar impulse response (1) and the convolution of the received radar return signal with the time-reversed, complex conjugated waveform (3) such that $$\hat{x}_{MF}(l) = r^T \tilde{x}(l) + u(l) \qquad (4),$$

where $\tilde{x}(l) = [x(l+N-1) \ldots x(l+1)\ x(l)\ x(l-1) \ldots x(l-N+1)]^T$, $u(l)$ is an additive noise correlated by the matched filtering, and r is a length 2N-1 convolution of the transmitted waveform s and a receive filter $\bar{s}^* = \lfloor s^*(N-1)\ s^*(N-2) \ldots s^*(0) \rfloor$,
substituting the matched filter output (4) as the received radar return signal in equation (1) for the operation $$\hat{x}_{RPCR}(l) = w^H(l) \hat{x}_{MF}(l) \qquad (5)$$

in which an assumed transmitted waveform is r,
estimating an optimal receive filter for each individual range gate as $$w(l) = \rho(l)(C(l)+R)^{-1} r \qquad (6)$$

where $\rho(l) = E[|x(l)|^\alpha]$ is an expected power of $x(l)$, $R = E\lfloor u(l)\ u^H(l) \rfloor$ is a noise covariance matrix, and the matrix $C(l)$ is defined as $$C(l) = \sum_{n=-2N+2}^{2N-2} \rho(l-n) r_n r_n^H \qquad (7)$$

in which $r_n$ contains the elements of the length 2N-1 waveform autocorrelation r right-shifted by n samples and the remainder zero filled.

11. A method as in claim 10, wherein (6) is applied reiteratively to improve the accuracy of the estimate.

12. A method as in claim 10, wherein $1 \leq \alpha \leq 1.7$.

13. A method as in claim 10, wherein a window of range gates is increased by 2M(2N-2) where M is the number of reiteration stages.

14. A radar pulse compression repair (RPCR) system, comprising:
a receiver for receiving a radar return signal;
a matched filter for applying matched filtering to said radar return signal to generate a matched filter output;
a processor, wherein said processor is programmed for applying Radar Pulse Compression Repair (RPCR) to said matched filter output to thereby suppress a plurality of range sidelobes from said matched filter output and thereby provide an RPCR-processed output; and
a detector for receiving the RPCR-processed output.

15. A system as in claim 14, wherein RPCR is repeated until the range sidelobes are suppressed to the level of a noise floor.

16. A system as in claim 14, wherein the received radar return signal at the $l^{th}$ range gate is defined as $$y(l) = x^T(l) s + v(l) \qquad (1)$$

for $l = 0, \ldots, L+N-2$, where $x(l) = [x(l)\ x(l-1) \ldots x(l-N+1)]^T$ is a set of impulse response coefficients that a transmitted waveform s is convolved with at delay l, $v(l)$ is additive noise, $(\bullet)^T$ is a transpose operation, and L is a number of range gates in a processing window,
a system response model based on collecting N samples of the received radar return signal is expressed as $$y(l) = [x(l)\ x(l+1) \ldots x(l+N-1)]^T s + v(l) = X^T(l) s + v(l) \qquad (2)$$

where $y(l) = [y(l)\ y(l+1) \ldots y(l+N-1)]^T$ and $v(l) = [v(l)\ v(l+1) \ldots v(l+N-1)]^T$,
the matched filtering operation comprises convolving the received radar return signal with a time-reversed complex conjugate of the transmitted waveform as expressed in the digital domain as $$\hat{x}_{MF}(l) = s^H y(l) \qquad (3),$$

the convolution of the transmitted waveform with the radar impulse response (1) and the convolution of the received radar return signal with the time-reversed, complex conjugated waveform (3) are combined and represented as $$\hat{x}_{MF}(l) = r^T \tilde{x}(l) + u(l) \qquad (4),$$

where $\tilde{x}(l) = [x(l+N-1) \ldots x(l+1)\, x(l)\, x(l-1) \ldots x(l-N+1)]^T$, $u(l)$ is an additive noise correlated by the matched filtering, and r is a length 2N−1 convolution of the transmitted waveform s and a receive filter $\bar{s}^* = \lfloor s^*(N-1)\, s^*(N-2) \ldots s^*(0) \rfloor$, substituting the matched filter output (4) as the received radar return signal in equation (1) for the operation $$\hat{x}_{RPCR}(l) = w^H(l)\hat{x}_{MF}(l) \qquad (5)$$

in which an assumed transmitted waveform is r,
estimating an optimal receive filter for each individual range gate as $$w(l) = \rho(l)(C(l)+R)^{-1} r \qquad (6)$$

where $\rho(l) = E[|x(l)|^2]$ is an expected power of $x(l)$, $R = E\lfloor u(l)\, u^H(l) \rfloor$ is a noise covariance matrix, and the matrix $C(l)$ is defined as $$C(l) = \sum_{n=-2N+2}^{2N-2} \rho(l-n) r_n r_n^H \qquad (7)$$

in which $r_n$ contains the elements of the length 2N−1 waveform autocorrelation r right-shifted by n samples and the remainder zero filled.

17. A system as in claim 16, wherein (6) is applied reiteratively to improve the accuracy of the estimate.

18. A system as in claim 17, wherein a window of range gates is increased by 2M(2N−2) where M is the number of reiteration stages.

19. A system as in claim 14, wherein the received radar return signal at the $l^{th}$ range gate is defined as $$y(l) = x^T(l)s + v(l) \qquad (1)$$

for l=0, . . . L+N−2, where $x(l) = [x(l)\, x(l-1) \ldots x(l-N+1)]^T$ is a set of impulse response coefficients that a transmitted waveform s is convolved with at delay l, $v(l)$ is additive noise, $(\bullet)^T$ is a transpose operation, and L is a number of range gates in a processing window, a system response model based on collecting N samples of the received radar return signal is expressed as $$y(l) = [x(l)\, x(l+1) \ldots x(l+N-1)]^T s + v(l) = X^T(l)s + v(l) \qquad (2)$$

where $y(l) = [y(l)\, y(l+1) \ldots y(l+N-1)]^T$ and $v(l) = [v(l)\, v(l+1) \ldots v(l+N-1)]^T$, the matched filtering operation comprises convolving the received radar return signal with a time-reversed complex conjugate of the transmitted waveform as expressed in the digital domain as $$\hat{x}_{MF}(l) = \bar{s}^H y(l) \qquad (3),$$

the convolution of the transmitted waveform with the radar impulse response (1) and the convolution of the received radar return signal with the time-reversed, complex conjugated waveform (3) are combined and represented as $$\hat{x}_{MF}(l) = r^T \tilde{x}(l) + u(l) \qquad (4),$$

where $\tilde{x}(l) = [x(l+N-1) \ldots x(l+1)\, x(l)\, x(l-1) \ldots x(l-N+1)]^T$, $u(l)$ is an additive noise correlated by the matched filtering, and r is a length 2N−1 convolution of the transmitted waveform s and a receive filter $\bar{s}^* = \lfloor s^*(N-1)\, s^*(N-2) \ldots s^*(0) \rfloor$, substituting the matched filter output (4) as the received radar return signal in equation (1) for the operation $$\hat{x}_{RPCR}(l) = w^H(l)\hat{x}_{MF}(l) \qquad (5)$$

in which an assumed transmitted waveform is r,
estimating an optimal receive filter for each individual range gate as $$i\ w(l) = \rho(l)(C(l)+R)^{-1} r \qquad (6)$$

where $\rho(l) = E[|x(l)|^\alpha]$ is an expected power of $x(l)$, $R = E\lfloor u(l)\, u^H(l) \rfloor$ is a noise covariance matrix, and the matrix $C(l)$ is defined as $$C(l) = \sum_{n=-2N+2}^{2N-2} \rho(l-n) r_n r_n^H \qquad (7)$$

in which $r_n$ contains the elements of the length 2N−1 waveform autocorrelation r right-shifted by n samples and the remainder zero filled.

20. A system as in claim 19, wherein $1 \leq \alpha \leq 1.7$.

21. A system as in claim 19, wherein (6) is applied reiteratively to improve the accuracy of the estimate.

22. A system as in claim 14, wherein a window of range gates is increased by 2M(2N−2) where M is the number of reiteration stages.

23. A system as in claim 9, further comprising an analog-to-digital converter for receiving and converting the matched filter output to a digital signal for processing by RPCR.

* * * * *